United States Patent [19]

Johnson

[11] 4,081,380
[45] Mar. 28, 1978

[54] FILTER CAKE COMPRESSOR

[75] Inventor: George Erick Johnson, Sausalito, Calif.

[73] Assignee: CPC International Inc., Englewood Cliffs, N.J.

[21] Appl. No.: 776,095

[22] Filed: Mar. 9, 1977

[51] Int. Cl.² ............................................. B01D 29/38
[52] U.S. Cl. ..................................... 210/332; 210/352
[58] Field of Search .................... 210/66, 67, 332, 350, 210/351, 352, 334

[56] References Cited

U.S. PATENT DOCUMENTS

| 3,708,072 | 1/1973 | Schmidt, Jr. | 210/332 |
| 3,814,257 | 6/1974 | Schmidt, Jr. | 210/332 |

*Primary Examiner*—John Adee

[57] ABSTRACT

Improved filter cake compression apparatus for leaf-type filtration systems is disclosed. Cake compressing diaphragms positioned on each side of each filter leaf are connected by resilient tension members to movable diaphragm support bars positioned peripherally around and perpendicular to the diaphragms and filter leaves. When cleaning of the filter leaves is needed, sets of the support bars are moved longitudinally in opposite directions to cause the diaphragms to move toward the filter leaves to engage the filter cake on both sides of each leaf. Upstream filter pressure and the pull of the connecting tension members cause the diaphragms to compress the filter cake against the filter leaf, and the amount of cake is reduced by squeezing the liquid portion of the feedstock from the cake.

4 Claims, 5 Drawing Figures

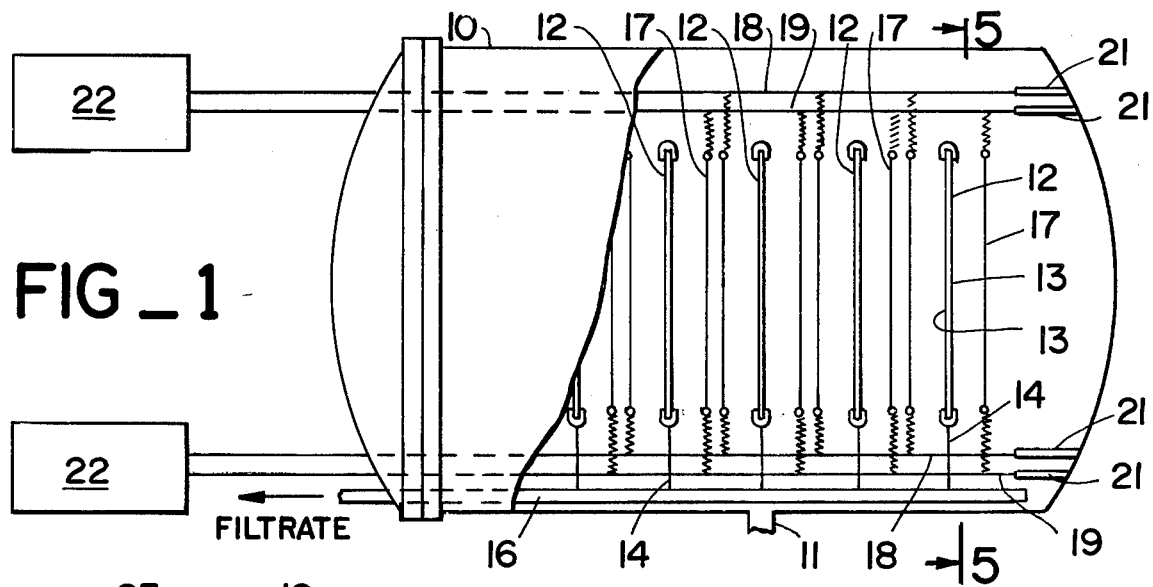
FIG_1
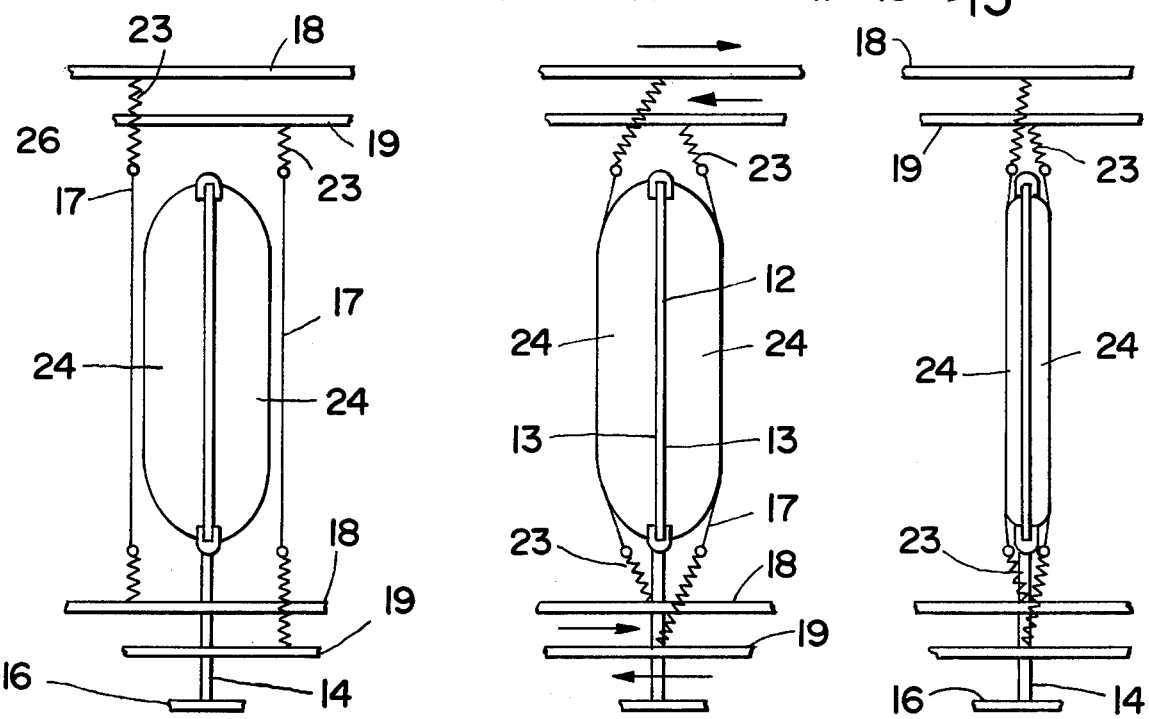
FIG_2  FIG_3  FIG_4
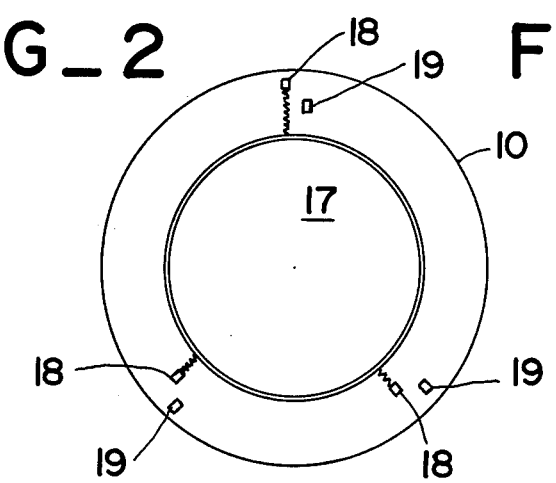
FIG_5

FILTER CAKE COMPRESSOR

BACKGROUND OF THE INVENTION

The invention relates to filtration systems for removing solids from liquids, and more particularly to an improved filter cake compression apparatus for leaf-type filter systems, useful to compress the cake against the filter surface so that its volume is reduced and it can be easily removed.

Filter cake compression apparatus is shown in U.S. Pat. Nos. 3,708,072 and 3,814,257. The apparatus of these patents utilizes flexible diaphragms resiliently mounted upstream of the perforate filtering surfaces of the filter leaves, so that when the filter cake builds up to the diaphragm, a pressure drop occurs between the cake and the upstream side of the diaphragm so that the diaphragm moves toward the leaf to compress the cake. The diaphragms were generally stretched by connecting tension members inside hoops connected to stationary supports.

Several problems were inherent in these compression systems involving non-movable diaphragm supports. During compression, the supporting springs for the diaphragms tended to pull the diaphragm away from the leaf, thereby diminishing the compressing action being exerted by hydraulic forces. The diminished compression was particularly acute toward the outside periphery of the leaf, where the diaphragm supporting springs acted, with the result that the cake would be wetter and less compressed near the periphery of the leaf. The center area would be the driest and most compressed.

Another problem with these cake compression systems actuated wholly by hydraulic pressure differences stemmed from the fact that not all filtering surfaces build up cake at the same rate. When many filter cakes had reached the diaphragm and were compressed, others had not yet built up to the corresponding diaphragm, and this difference could occur on two sides of the same leaf. Thus, when enough filter cakes had been compressed that little filtration was occurring and cleaning was necessary, some cakes remained wet and uncompressed.

SUMMARY OF THE INVENTION

The present invention provides an improved filter cake compression apparatus for leaf-type filtration systems, avoiding the shortcomings of prior diaphragm type apparatus. The cake compressing diaphragms of the invention, positioned on each side of each filter leaf, are connected to longitudinally movable diaphragm support bars spaced peripherally around and perpendicular to the diaphragms and filter leaves. One set of the support bars is movable in one direction while the other set is movable in the opposite direction, and each diaphragm is connected to the appropriate set of bars to be moved toward the adjacent filter leaf surface. Prior to cleaning of the filter leaves, the sets of bars are moved in opposite directions to bring the diaphragms in contact with the filter cakes and compress and dry the cakes. All cakes are therefore dried prior to cleaning of the filter leaves.

The diaphragms are preferably connected to the support bars by resilient tension members, so that hydraulic pressure can be used, in combination with the pressure exerted by the bars on the diaphragms, to compress the filter cakes. The bars simply move all diaphragms into contact with the cakes, with the resilient connecting members tensioned and tending to pull the diaphragms to the fully compressed position. Even if a cake builds up to the point of reaching the adjacent diaphragm before the support bars have been moved, compression can commence at this point since the diaphragms are resiliently mounted. When the bars converge the diaphragms toward the filter leaves, the compression of all cakes can be completed in a normal way.

It is therefore among the objects of this invention to provide a filter cake compression system wherein the compressing diaphragms may be brought to all the cakes at whatever time is determined advisable to terminate the filtration operation, without the necessity of waiting for the cakes to reach the diaphragms, and wherein relatively simple apparatus is provided for this purpose. These and other objects, advantages and features of the invention will be apparent from the following description of one preferred embodiment, taken in conjunction with the appended drawings.

DESCRIPTION OF THE DRAWINGS

FIG. 1 is a schematic, partially broken away elevation view of a filter tank with leaf-type filters and filter cake compression apparatus according to the invention;

FIG. 2 is an enlarged schematic elevation view showing a filter leaf with filter cake built up on both sides and a pair of compression diaphragms connected to movable support bars according to the invention;

FIG. 3 is a view similar to FIG. 2 but showing the support bars converging the diaphragms onto the filter cakes;

FIG. 4 is another similar view, showing the filter cakes fully compressed; and

FIG. 5 is a sectional view taken along the line 5—5 of FIG. 1, showing the position of the diaphragm support bars within the tank.

DESCRIPTION OF A PREFERRED EMBODIMENT

In the drawings, FIG. 1 shows a filtering system including a tank 10 which receives liquid feedstock through an inlet 11 and contains a plurality of leaf-type filters 12, each having opposed perforate filtering surfaces 13 as in the filter leaves of the above-referenced U.S. Pat. Nos. 3,708,072 and 3,814,257. The feedstock enters the tank 10 under pressure and is filtered as it passes through the filtering surfaces 13 into the interiors of the filter leaves 12. The filtrate then passes through filter outlet lines 14 into a header pipe 16 to be conducted out of the tank. While this occurs, filtered material builds up as cake on both sides of the filter leaves.

As in the apparatus of the above-referenced patents, the present filtering system also includes impervious filter cake compressing diaphragms 17 mounted in spaced parallel relationship to each filtering surface 13. However, the diaphragms 17 of the invention are mounted in a manner that provides for more efficient and complete filter cake compression. Each diaphragm is connected to a plurality of diaphragm support bars 18 or 19 disposed peripherally around the diaphragms and filter leaves and at right angles to the planar surfaces of the diaphragms and filter leaves. These support bars 18 and 19 are slidably received in tank-connected mountings 21 and in support bar shifting mechanisms 22 which shift the positions of the bars 18 and of the bars 19, in opposite directions, when cleaning of the filter cakes off the filters is to be instituted. Any of a number of types of well-known apparatus can be used for the shifter mechanisms, which are only required to move the respective bars longitudinally upon the receipt of a signal, then to return them to their original positions on a second signal. Pneumatic or hydraulic cylinders may be used, or a mechanical crank arm or other type assembly. Although the drawing shows separate mechanisms 22 for support bars at different locations, the bars 18 can be connected together outside the tank, as can the bars 19, for movement by a single shifter for each group.

As shown in FIGS. 1-4, the diaphragms 17 are preferably connected to the support bars 18 or 19 by means of resilient tension members 23 which may take the form of tension springs. This enables the bars 18 and 19 to be moved to the shifted position shown in FIG. 3, bringing the diaphragms into contact with filter cakes 24 built up on the filter leaves 12 and exerting a slight compression force on them, but allowing hydraulic pressure to exert a large part of the force which compresses the cakes to the flattened state shown in FIG. 4.

The number of support bars 18 and 19 positioned around the periphery of the diaphragms 12 depends upon the extent to which the diaphragms have rigidity tending to maintain them in planar configuration. There should be at least three sets of bars in the case of a circular filter leaf, as shown in FIG. 5, so that the diaphragm cannot rotate and will remain parallel to the filter leaves. Two sets of bars would be sufficient for a rectangular leaf, as long as means are provided for maintaining the diaphragms rigid and parallel to the leaves. Such means can take any suitable form. No special rigidity imparting means need be provided if three or more sets of bars 18 and 19 are provided, since this will adequately stretch the diaphragms and maintain their orientation.

As shown in FIGS. 2, 3 and 4, the support bars 18 are moved to the right when it is deemed advisable to terminate the filtering operation for cleaning, and the support bars 19 are moved to the left. At each filter leaf, one diaphragm is connected to the group of support bars 18 while the other diaphragm is, of course, connected to the other group of support bars 19, so that the diaphragms converge on the filter leaf and engage the filter cakes 24. It is thus not necessary to wait for the cakes to build up to the point of reaching the diaphragms, as was required with previous filter cake compression apparatus, to terminate filtering and compress the cakes. Moreover, all cakes are compressed with the present system, regardless of their varied thicknesses.

After the support bars 18 and 19 and diaphragms 17 have moved to the position shown in FIG. 3, a closing force exerted by the angled tension members 23, along with the hydraulic compression forces, causes the diaphragms to close in on the filter leaf and compress the filter cakes, as illustrated in FIG. 4, reducing their size.

The tank 10 can then be opened and the compressed and dried cakes removed by conventional means, after the diaphragms have been retracted.

The above described preferred embodiment provides an improved filter cake compression system which is relatively simple in construction but highly efficient and thorough in operation. Various other embodiments and variations to this preferred embodiment will be apparent to those skilled in the art and may be made without departing from the spirit and scope of the following claims.

I claim:

1. In a filtering apparatus of the type wherein a porous, loose filter cake is deposited and builds up on a perforate surface of a filter leaf, an improved means for compressing the filter cake to cleaning, comprising:
    a flexible imperforate diaphragm with means tending to maintain the diaphragms in planar configuration;
    a plurality of diaphragm support bars positioned in spaced relationship around the periphery of the diaphragm and of the filter leaf, perpendicular to the diaphragm, with means mounting the support bars for longitudinal movement;
    means connecting the diaphragm to the support bars with the diaphragm in spaced parallel relationship to the perforate surface of the filter leaf; and
    means for moving the support bars in the direction of the filter leaf;
    whereby, when the filter cake builds up to a thickness requiring cleaning, the moving means can be activated to move the diaphragm toward the filter leaf, resulting in the compression of the filter cake against the filter leaf.

2. The apparatus of claim 1 wherein said means connecting the diaphragm to the support bars includes resilient tension members extending from the periphery of the diaphragm to the support bars, whereby, if the filter cake builds up against the diaphragm before the moving means is actuated, upstream pressure will immediately begin compressing the filter cake.

3. The apparatus of claim 1 wherein the filter leaf has two perforate surfaces facing opposite directions, with a diaphragm provided on each side, and wherein the diaphragm support bars are in two groups, one movable in one direction for moving one diaphragm toward the adjacent filter leaf surface and the other movable in the opposite direction for moving the other diaphragm toward the other filter leaf surface.

4. The apparatus of claim 3 including a plurality of filter leaves in aligned, spaced parallel relationship, with a pair of diaphragms about each filter leaf, each diaphragm being connected to an appropriate one of said groups of diaphragm support bars.

* * * * *